2,863,227

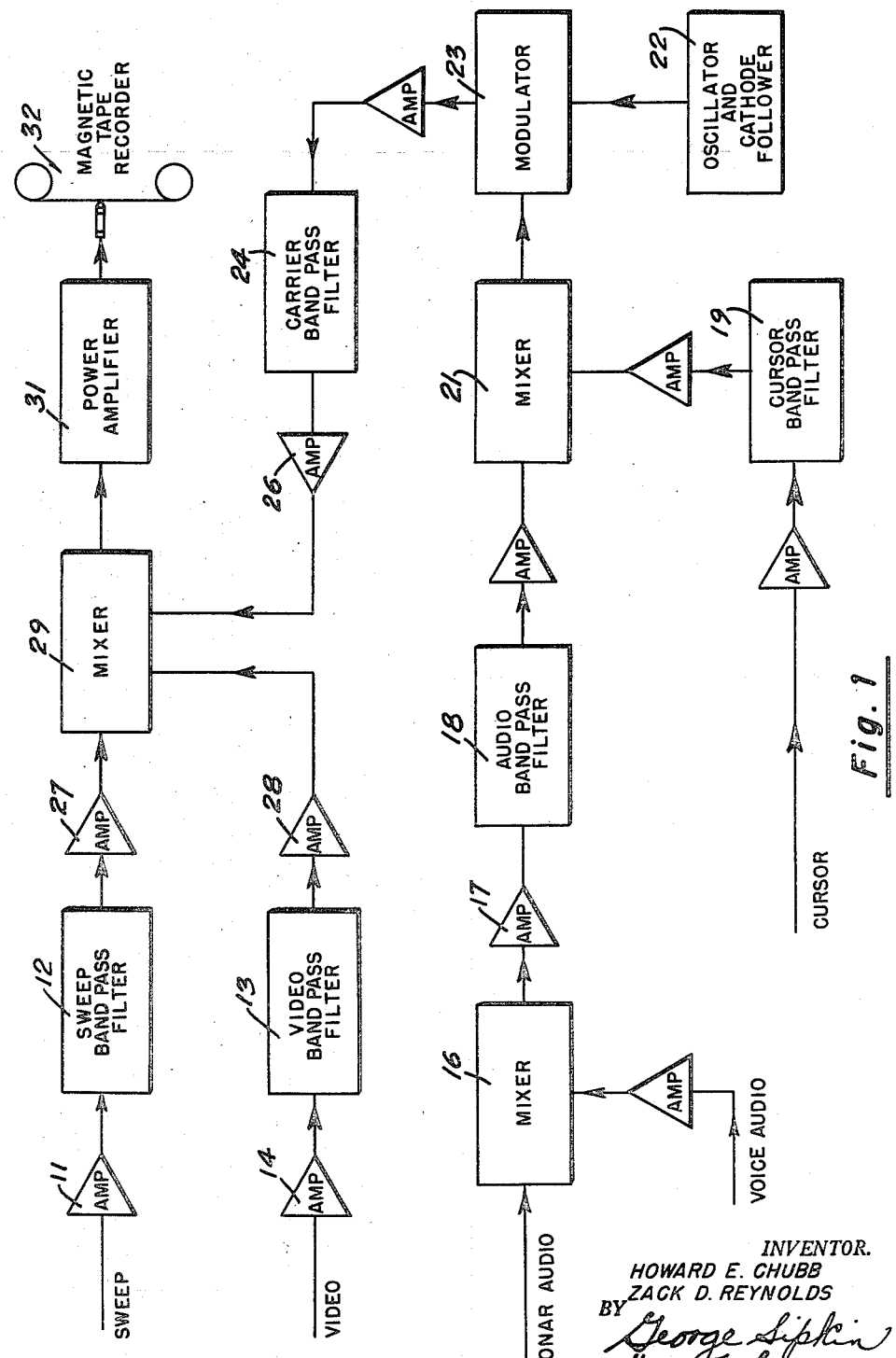

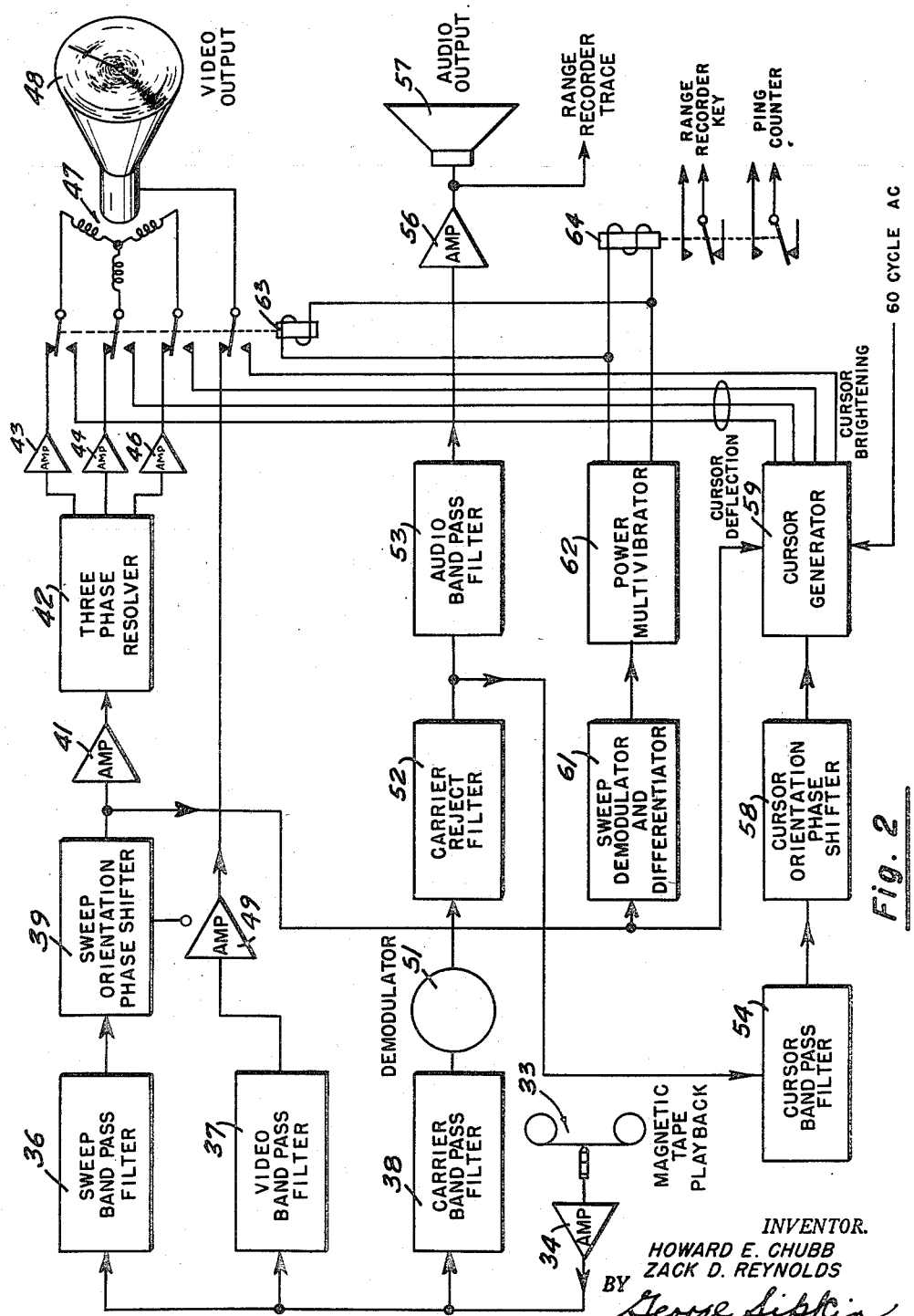

TRAINING APPARATUS REPRODUCING THE VISUAL AND AUDIBLE PRESENTATIONS OF AN ELECTRONIC SCANNING SYSTEM

Howard E. Chubb, San Diego, and Zack D. Reynolds, La Mesa, Calif., assignors to the United States of America as represented by the Secretary of the Navy Application July 19, 1954, Serial No. 444,406

8 Claims. (Cl. 35—10.4)

(Granted under Title 35, U. S. Code (1952), sec. 266)

The invention described herein may be manufactured and used by or for the Government of the United States of America for governmental purposes without the payment of any royalties thereon or therefor.

This invention relates to training devices and more particularly to a method and apparatus for accurately reproducing the visual displays, audio signals, and voice of an electronic scanning system such as sonar or radar in actual operation.

Previous trainers for this purpose have utilized synthetic information from problem generators or manual controls to present a simulated video display and corresponding audio, and other training apparatus utilized still or moving pictures of the display scope during actual operation usually with the audio counterpart. The flying-spot technique has also been tried such as the system used in conjunction with an RCA 5WP15 tube, but these systems did not present a realistic display or consisted of a static rather than a dynamic presentation of the information.

The present invention is an improvement on the invention disclosed in the co-pending application of Howard E. Chubb for Method and Apparatus for Recording and Reproducing a Video Display and its Audio Counterpart, Ser. No. 444,407, filed July 19, 1954, and consists essentially of a method and apparatus for accurately recording sweep, video, and cursor information from the electronic circuits for the visual display scope of equipment, such as sonar, during an actual run while tracking a submarine and simultaneously recording on the same channel the audio counterpart of the visual signal corresponding to the cursor bearing, and any voice information or spoken commentary by the operators during the run using a multiplex recording technique wherein a carrier is modulated by the combined audio and cursor information and mixed with the combined sweep and video prior to recording on a single channel. The composite signal may be later reproduced from the tape at at any time by separating the information with suitable filters and demodulation. The sweep information is passed through a phase orientation shifter which provides for proper orientation of the display on the scope with respect to true north, and is resolved into three phases for application to the deflection coils of a display scope. The video is applied directly to the grid of the display scope and the audio information, both sonar and voice, is transmitted to suitable earphones or loudspeakers. The cursor information is also passed through an orientation phase shifter which properly orients the cursor with the display on the scope and is passed through a cursor generator which applies a deflection and cursor brightening signal to the deflection coils and grid of the display scope. The rapid decay of the sweep voltage is utilized for generating a pulse to switch the scope from the sweep and video display to the cursor deflection and its associated brightening and is also utilized to actuate the tactical range recorder and a ping counter. The sonar audio may also be transmitted to the range recorder trace.

One object of the present invention is to provide a method and apparatus for the recording and reproduction of sweep, video, and audio electrical signals, and reproducing a realistic and accurate visual display properly oriented with respect to the original display together with the corresponding audio output.

Another object of the present invention is to provide an improved sonar recognition training device wherein the original sonar visual display and audio counterpart are accurately and realistically reproduced in exact correlation and as a true replica of the sonar presentation aboard ship during actual operation.

Still another object of the present invention is to provide a dynamic reproduction of a shipboard sonar presentation maintaining proper synchronization of the sweep, video, and cursor information, and providing a substantially jitter free video presentation on a plurality of display scopes accompanied by the audio presentation consisting of reverberations, water noise, and echoes detected by the sonar transducer, and spoken commentary by the operators.

A still further object of the present invention is to provide sonar operators with sonar recognition training by the technique of accurately reproducing the video and audio information recorded on magnetic tapes and supplying this information to a self-contained display scope and loudspeaker or to a conventional scanning sonar installation including repeaters and a tactical range recorder.

Still another object of the present invention is to provide apparatus for reproducing the video and audio information from shipboard scanning sonar installation which may be subjected to continuous use for long periods under varied and severe conditions of military service, and which is reliable and stable in operation irrespective of variations in supply voltages and frequencies in the shipboard installation.

Other objects and many of the attendant advantages of this invention will be readily appreciated as the same becomes better understood by reference to the following detailed description when considered in connection with the accompanying drawings wherein:

Fig. 1 is a block diagram illustrating one preferred embodiment of a recording method and apparatus in accordance with the present invention; and Fig. 2 is a block diagram illustrating one preferred embodiment of a method and apparatus for reproducing the video and audio information recorded by the apparatus of Fig. 1 and actuating a tactical range recorder and ping counter.

One conventional system with which the training device specifically disclosed herein may be used comprises a projecting and receiving sonar transducer having a plurality of sections arranged to cover 360° of azimuth. All sections of the transducer are energized to project an omni-directional pulse while a scanning switch rotating at some convenient frequency successively connects adjacent transducer sections to the receiver. The equipment includes a speaker for aural presentation of echoes and a cathode ray tube for visual presentation of range and bearing. The sweep of the CRT is a spiral produced by two or more amplitude modulated sine waves which may be generated in two or more stator coils by a rotor coil inductively coupled thereto and mechanically driven by the scanning switch drive whereby synchronism between the sine waves and the scanning transducer receiving beam is ensured despite variations in the ship's power supply and the use of a non-synchronous motor drive. Each sine wave is amplitude modulated by a D.-C. sawtooth wave having a frequency equal to the keying frequency which may be from 0.5 to 0.1 cycle per second, depending upon the selected range scale, and keyed by the transmitted pulse through the pulse keying relay. The modulated sine waves are applied to the deflection controls of the CRT. Thus there is a beam trace which sweeps angularly about the center of the CRT screen in synchronism with the azimuth sweep of the transducer receiving pattern and which moves radially outwardly at the much lower frequency (pulse repetition rate) determined by the rate of increase of the amplitude of the sawtooth envelope to provide the spiral sweep. Echoes received by the several transducer sections are fed through the scanning switch, suitably amplified, and applied to the intensity control of the CRT whereby the position of the echo intensified beam trace indicates both bearing (measured angularly from a line through the center of the screen) and range (measured radially from the center of the screen) of the target when the sweep is properly oriented relative to the scanning switch and transducer. The stern pipper showing own ship's bearing employs pulses produced from and in synchronism with the scanning rate frequency to intensity modulate one point on each circular sweep of the beam trace and appears as a straight line when the CRT is correctly adjusted. Following the collapse of sweep potentials on the CRT indicator prior to the beginning of a new sweep cycle, the bearing and range cursor is electronically painted on the tube screen. The cursor is a line originating at the center and having an angular position corresponding to the bearing along which the acoustic beam pattern of the audio scanning switch is trained. The length of this line can be adjusted by the operator and the range, corresponding to this length, can be read from a calibrated dial. The deflecting coils of the CRT are transferred from the spiral sweep to the cursor generator by relays activated by decay of the sweep voltages. The cursor generator rotor is excited by a 60 cycle voltage proportional in amplitude to range so that the deflection coils are energized with a set of standard synchro signals proportional to range. This causes the electron beam to traverse the screen along a diametrical line in simple harmonic motion, the extreme magnitude of displacement being proportional to the exciting voltage, and hence range. To eliminate 180° ambiguity the cursor trace must be visible as a radius and not a diameter. This is done by applying to the CRT control grid an A. C. voltage in phase with the deflection so that the positive half cycles cause the trace to be visible at corresponding half cycles of deflection and negative half cycles blank the trace during deflection toward its 180° point. In order to produce a cursor of uniform intensity along its length simple A. C. modulated intensity is not used. Instead, the A. C. grid signal is limited so that the positive half cycle is essentially a square pulse.

In addition to recording and reproducing the various signals fed into the ship's sonar indicator to reproduce as a true replica the audio and video output for training purposes, a voice audio is also used to enhance the training value.

Referring now to the recording unit illustrated in Fig. 1 in block diagram form, the sweep information from the electronic circuits of a conventional scanning sonar installation is applied through an amplifier 11 to the sweep band-pass filter 12. The sweep information to be recorded consists of one phase of the three-phase 150 cycles per second spiral sweep supply for the deflection coils of the display scope of the sonar equipment and is limited in frequency by the sweep band-pass filter 12 to substantially 150 cycles per second, plus or minus 10 cycles per second. The video information, consisting of signals ranging in intensity or amplitude for spot brightening associated with the stern pipper indication and with signals received from the water by the sonar transducer is subjected to adequate filtering in the video band-pass filter 13, after being amplified, at 14 to limit the useful frequency range within the region of 300 cycles per second to 3 kilocycles.

The sonar audio information, consisting of the reverberations, water noise and echoes detected by the sonar transducer on a particular bearing, is mixed at 16 with the amplified voice audio consisting of spoken commentary by the operators and is amplified at 17 before being limited by the audio band-pass filter 18 to a range of 300 cycles per second to 3 kilocycles.

The bearing of the cursor, generated by the shipboard sonar, is established by phase displacement of one phase of the three phase sweep supply. The phase difference between the phase shifted 150 cycles per second and the recorded sweep input referred to supra determines the bearing associated with the cursor.

The frequency limited audio and the phase shifted and filtered 150 cycles per second cursor information, filtered at 19 is mixed at 21 and is used to linearly amplitude-modulate a 10 kilocycle carrier generated by the oscillator and isolated by a cathode follower designated as 22.

The 10 kilocycle carrier, modulated at 23 by the combined audio and cursor information, is subjected to a carrier band-pass filter 24 to eliminate unwanted sidebands and is further amplified at 26.

The output of the sweep band-pass filter 12 and the video band-pass filter 13 is further amplified at 27 and 28 respectively, and mixed linearly in mixer 29 with the modulated carrier in the proper proportion for optimum recording characteristics before being presented, through a power amplifier 31, as a single signal to a single channel high quality, magnetic tape recorder 32.

The analyzer or play-back unit as illustrated in Fig. 2 is one preferred embodiment of this portion of the invention and consists of a magnetic tape play-back unit 33 which receives a single input signal from the tape which is amplified at 34 before being separated into its various frequency components by controlled filters 36, 37, and 38.

A 150 cycle per second filter, flat within plus or minus 10 cycles per second and with high attenuation to off frequencies, is utilized as a sweep frequency band-pass filter 36 to separate the sweep signal into one channel. The single phase signal is fed through a sweep orientation phase shifter network 39, whose function will be described subsequently, and after amplification at 41 is passed through a three-phase resolver or phase splitter 42 to provide a three-phase signal which goes through the three power amplifiers 43, 44, and 46 for supplying the deflection yokes 47 of the cathode ray tube 48. These power amplifiers should be capable of operating a large number of display units for training purposes.

A take-off of the single-phase sweep frequency immediately following the sweep orientation phase shifter 39 is used as a reference for other circuits pertinent to the operation of the equipment as will be described infra.

The video information is separated by the video band-pass filter 37 which passes the recorded frequencies from 300 cycles per second to 3 kilocycles. It is then amplified at 49 to the proper level and inserted on the grid of the display scope or scopes, and in combination with the three-phase sweep supply to the deflection yokes 47, provides a display similar to that indicated on the face of the cathode ray tube 48 in Fig. 2, to provide the video output.

The bearing of any given increment of video information is established in exact time reference to the one-phase of the sweep supply recorded because of the synchronous nature of the video pickup on the bearing scan switch with respect to the generated 150 cycle per second sweep frequency in the shipboard sonar equipment.

The modulated 10 kilocycle carrier signal is separated by a carrier band-pass filter 38 covering 7 to 13 kilocycles. This signal is linearly demodulated in the demodulator 51 and subjected to a 10 kilocycle carrier-reject filter 52. The composite signal is then separated into audio and a phase-shifted sweep frequency by a 300 cycles per second to 3 kilocycles audio band-pass filter 53 and a 140 to 160 cycles per second cursor band-pass filter 54.

The audio frequencies are amplified at 56 to a level sufficient to drive one or more loudspeakers 57 and the tactical range recorder trace simultaneously.

The output of the cursor band-pass filter 54, consisting of a phase modulated 150 cycles per second sweep frequency after passing through a cursor orientation phase shifter 58, is compared with the oriented single-phase sweep frequency from the sweep orientation phase-shifter 39 noted supra. In the cursor generator 59, servo techniques are utilized to position a synchro control-transformer by an amount corresponding to the cursor bearing. A 60 cycle A. C. current fed to the cursor generator 59 is then utilized to develop a 60 cycles per second three-phase cursor deflection signal and a cursor brightening pulse at the proper bearing in a conventional manner.

The sweep orientation phase-shifter network is manually controllable by the operator and should be capable of varying the output phase with respect to the input over a range of plus or minus 180 degrees. This control is used to properly orient the bearing of the perceived video picture in accordance with the true bearings of the recorded information. The cursor orientation phase shifter 58 is also manually controlled by the operator to properly orient the phase of the cursor information with respect to the sweep phase. The proper orientation of the perceived video picture with respect to true bearings and the proper orientation of the cursor with respect to the true bearings on the picture may be determined by voice information during a preliminary test period, prior to reproduction of the normal operation of the sonar equipment during a run.

The single phase sweep signal is also applied to a sweep demodulator and differentiator circuit 61 which provides a pulse generated from the modulation upon the rapidly decaying sweep voltage. This pulse is applied through a power multivibrator 62 to two transfer relays 63 and 64.

During the sweep time, the three-phase sweep and video signal are connected to the display scope in the normal position of the upper relay 63 in Fig. 2. At re-key time, the cursor deflection and its associated brightening is switched to the display scope. The lower transfer relay 64 in Fig. 2 is utilized to provide a fly-back connection for keying the range recorder. The ping counter is also actuated by the lower relay and advances one unit with each scan, to provide a method of reference for the separate scans. This counter is easily re-set by finger pressure on a button or lever, not shown, by the operator.

The optimum functioning of the method and apparatus of the present invention depends to a large degree on the control of the signals during recording, storage, and playback. It is essential that each frequency band be well isolated from all others, that a minimum of harmonic and intermodulation distortion be introduced, that all phase relations of the recorded sweep and cursor be relatively independent of sweep frequency, and that hum and line frequency pickup be kept to a minimum. It is particularly important that the units be free from excessive microphonics.

Variations in the phase relationships relative to the sweep frequency result in bearing errors. It is therefore extremely important that the sweep and cursor band-pass filters 36 and 54 pass all signals within the useful frequency range with a substantially constant phase shift, so that there is no phase shift with variations of the frequency within the pass band. Any variation in the phase shift with variations in frequency or voltage will result in a displacement in bearing of a particular point resulting in distortion of the picture. This is particularly noticeable on the stern pipper indication which should appear as a straight line and which will appear as a crooked line if any variations in phase exist or take place during the sweep.

Another extremely important factor which should be carefully controlled in order to present a display which is substantially an exact replica of the original display on the shipboard sonar equipment is the movement of the magnetic tape past the recording or reproducing head in the recording and playback unit. Any variations of speed of the magnetic tape linearly as its moves past the recording head or any vibration or variation of the spacing of the tape laterally with respect to the head will materially effect the quality of the picture, also resulting in different forms of distortion of the visual display.

Intermodulation and harmonic distortion results in a distorted sweep and cluttered audio and video presentations. Noise, hum, and microphonics result in cluttered video presentations, jittery sweep and unrealistic target definitions.

The three phase resolver 42 which splits the single phase sweep frequency output of the sweep orientation phase shifter 39 into a three phase supply preferably consists of a stabilized phase shifting network which provides three signals at the sweep frequency with 120 degrees phase displacement between each output uniformly over the useful frequency range of 140 to 160 cycles per second without any variations in the phase shift due to variations in the frequency within this useful range.

The phase of the 150 cycles per second sweep output from the sweep orientation phase shifter 39 is compared to the phase of the cursor information emanating from the cursor orientation phase shifter 58 by a servo system so that the rotor of a synchro-control-transformer is positioned mechanically as the two compared signals exist electrically. The rotor of the synchro is supplied with a 60 cycle A. C. voltage. The stator leads of the synchro are used to bring out the 60 cycle voltages for the cursor deflection to the deflection coils 47 of the display scope. The cursor brightening pulse is generated in a conventional manner by supplying positive half cycles of properly phased 60 cycle A. C. to the grid of the display scope.

The transfer relays 63, 64 are activated by the sweep demodulator and differentiator 61 and the power multivibrator 62 wherein a pulse is generated by the fall of the sweep envelope. The sweep signal is rectified and filtered by a network having a relatively short time-constant. The resulting waveform is differentiated, and the sharp trigger produced initiates the power multi-vibrator 62 which is capable of rapidly closing the relays 63, 64 over a short time interval preferably corresponding to approximately three cycles of the line supply frequency.

The various inputs for the recorder unit illustrated in Fig. 1 are preferably matched and monitored for optimum recording. The monitoring may consist of individual level indicators on each channel or a single level indicator with a switching arrangement for sampling each of the separate channels prior to mixing and recording.

The various components and circuitry shown in the drawings in block diagram form are conventional and well known to those skilled in the art, particularly in view of the functions and characteristics mentioned supra in connection with the block diagrams. For example, in the recorder, the amplifiers may be of the type shown in Fig. 14 on page 374 of the Radio Engineer's Handbook, first edition, copyright 1943, by Terman, published by McGraw-Hill Book Company. Power amplifier 31 may be of the type shown in Fig. 16, page 377, ibid. The oscillator in block 22 may be of the type shown in Fig. 2, page 481, ibid, modulator 23, in Fig. 13, page 543, ibid, and the filters of the type shown in circuit IV, page 231, ibid. The cathode follower in block 22 is found in Fig. 6–43, page 308, Radio Engineering, third edition, copyright 1932, 1937, and 1947, by Terman, published by the Mc- Graw-Hill Book Company. Mixers 16, 21, and 29 are of the type shown in Fig. 18.15, page 644 of volume 19, "Waveforms," MIT's Radiation Laboratory Series, copyright 1949, published by McGraw-Hill Book Company. In the reproducer in Fig. 2, sweep orientation phase shifter 39 is shown in Fig. 56a, page 949, Radio Engineer's Handbook, supra. Three phase resolver 42 uses a Scott connection which makes use of a bank of two single-phase transformers to form a three phase Delta circuit. Sec. 6, para, 95; Fig. 6–19, page 586, ninth edition of the Standard Handbook for Electrical Engineers, McGraw-Hill Book Company, 1957. Power multivibrator 62 is shown in Fig. 12–8, page 591, of Radio Engineering, supra, and differentiator 61 is shown in Fig. 12–16, page 599, of Radio Engineering, supra. The cursor generator component is of the type shown in Fig. 7–23 and discussed starting on pages 2–9 of NavShips 91544(A), Instruction Book for Sonar Sets, obtainable from U. S. Navy District Publications and Printing Offices.

While many modifications within the scope of the present invention will be apparent to those skilled in the art, one such variation which may be advisable is to eliminate interference between the sonar and voice audio, particularly with respect to the range recorder trace, and also permit a wider frequency range in recording of the video information. This is accomplished by recording the complete video, without filtering, on a separate channel of the same magnetic tape and applying this directly, on play-back, through an amplifier to the intensity control grid of the display scope to present a somewhat more complete visual presentation with better resolution in the video output. The channel designated for video in Figs. 1 and 2 can then be utilized for the sonar audio with the same frequency range of 300 cycles per second to 3 kilocycles. The voice commentary would be retained on the carrier as previously described. The sonar audio information, on play-back, could then be applied directly to the range recorder trace and to separate head phones and speakers or to the same head phones and speakers utilized for the voice audio, but in either case this would present a clean sonar audio signal to the range recorder.

In utilizing the method and apparatus of the present invention in conjunction with radar or other analagous systems it may be necessary to modify the apparatus. As an example, in radar much faster sweeps and higher frequency information must be recorded and reproduced. It may therefore be necessary to utilize a memory device and record at slower speeds unless improved magnetic tape recorders are developed to handle this information. Since radar and other similar systems use different types of sweep than the spiral sweep commonly utilized in sonar, the sweeping information recorded and the system of reproducing the sweep may vary.

Obviously many modifications and variations of the present invention are possible in the light of the above teachings. It is therefore to be understood that within the scope of the appended claims the invention may be practiced otherwise than as specifically described.

What is claimed is:

1. Apparatus for reproducing visual and audio presentations of an electronic system comprising means for recording a plurality of individual signals representative of said presentations on a single recording medium, one of said signals being a replica of one phase of the three phase sweep supply of said system, a second signal being a replica of the video supply of said system, a third signal being a replica of the audio signals in said system, means for reproducing said individual signals from said medium, means for developing three phase sweep voltages from said one phase sweep signal corresponding to the sweep voltages in said system, means for applying said developed sweep voltages to the deflection elements of a display device, means for applying the video signal to the intensity control of said display device, and means for reproducing the audio from said audio signals.

2. Apparatus for reproducing visual and audio presentations of an electronic system means for comprising recording a plurality of individual signals representative of said presentations on a single recording medium, one of said signals being characteristic of the three phase sweep supply of said system, a second signal being a replica of the video supply of said system, a third signal being a replica of the audio signals in said system, a fourth signal being characteristic of the relative bearing of a bearing indicating line of said system, means for reproducing said individual signals from said medium, means for developing three phase sweep voltages from the reproduced sweep signal corresponding to the sweep voltages in said system, means for applying the said developed sweep voltages to the deflection elements of a display device, means for applying the reproduced video signal to the intensity control of said display device, means for reproducing the audio from said reproduced audio signals, means for generating sweep and brightening voltages for a bearing indicating line from said reproduced bearing signal, and means for applying said bearing voltages to said display device.

3. Apparatus as set forth in claim 2 wherein the visual presentation is oriented and said bearing indicating line is oriented with respect to said visual presentation.

4. Apparatus for reproducing the visual and audio presentations of an electronic scanning system, comprising means for recording a composite signal consisting of a plurality of individual signals representative of said presentations on a single channel of a continuous magnetic recording medium, one of said signals being characteristic of one phase of the three phase sweep supply of said system and limited to a specific low frequency band, a second signal being a replica within a separate higher frequency band of the video supply of said system, a third signal being a replica of the audio signals in said system within a high frequency band, a carrier wave modulated by certain of said signals, said modulated carrier being mixed with certain other signals to form said composite signal, means for reproducing said composite signal from said medium and separating the same into separate signals corresponding to the individual recorded signals, means for developing from the reproduced sweep signal three phase sweep voltages corresponding to the sweep voltages in said system, means for applying said developed sweep voltages to the deflection coils of a display device, means for applying the reproduced video signal to the intensity control of said display device, and means for reproducing the audio from said audio signals.

5. Apparatus for reproducing the visual and audio presentations of an electronic scanning system, comprising means for recording a composite signal consisting of a plurality of individual signals representative of said presentations on a single channel of a continuous magnetic recording medium, one of said signals being characteristic of one phase of the three phase sweep supply of said system and limited to a specific low frequency band, a second signal being a replica within a separate higher frequency band of the video supply of said system, a third signal being a replica of the audio signals in said system within a high frequency band, a fourth signal being characteristic of the relative bearing of a bearing indicating line of said system and limited to a specific lower frequency band than said third signal, a carrier wave modulated by certain of said signals, said modulated carrier being mixed with certain other signals to form said composite signal, means for reproducing said composite signal from said medium and separating the same into separate signals corresponding to the individual recorded signals, means for developing from the reproduced sweep signal three phase sweep voltages corresponding to the sweep voltages in said system, means for applying said developed sweep voltages to the deflection coils of a display device, means for applying the reproduced video signal to the intensity control of said display device, means for reproducing the audio from said audio signals, and means for generating a bearing indicating line from said bearing signal for display on said device.

6. Apparatus as set forth in claim 5 wherein the visual presentation is oriented and said bearing indicating line is oriented with respect to said visual presentation.

7. Apparatus for reproducing the visual and audible presentations of an electronic scanning system comprising means for recording a composite signal consisting of a plurality of individual signals representative of said displays on a single channel of a continuous magnetic recording medium, one of said signals being characteristic of one phase of the three phase sweep supply of said system, means for limiting said one signal to a specific low frequency band, a second signal being a replica of the video supply of said system, means for limiting said second signal to a separate higher frequency band, a third signal being a replica of the audio signals in said system, means for limiting said third signal to a separate higher frequency band, a fourth signal being characteristic of the relative bearing of the bearing indicating line of said system, means for limiting said fourth signal to a specific low frequency band, means for mixing said third and fourth signals, means for generating a carrier wave, means for modulating said carrier wave by said third and fourth signals, means for mixing said modulated carrier with said first and second signals to form said composite signal, means for reproducing said composite signal from said medium, means including a video band pass filter for separating said composite signal into separate signals corresponding to the individual recorded signals, a display device having deflection elements and intensity controls, means for developing from the reproduced sweep signal three phase sweep voltages corresponding to the sweep voltages in said system, means normally connected to said developing means for applying said developed sweep voltages to the deflection elements of said device, connected to said video filter means for applying the video signal to the intensity control of said device, means for reproducing said audio signals, means for generating a bearing indicating line from said bearing signal for display on said device, transfer relay means for transferring connection of said deflection elements from said developing means to said bearing line generating means and connection of said intensity control from said video filter to said bearing line generating means, and means for demodulating and differentiating said reproduced sweep signal to provide a pulse for activating said transfer relay means.

8. Apparatus as set forth in claim 7, wherein means is provided for orienting the visual presentation of said video signal on said display device and for orienting said bearing indicating lines with respect to said visual presentation.

References Cited in the file of this patent

UNITED STATES PATENTS

| | | |
|---|---|---|
| 2,164,297 | Bedford | June 27, 1939 |
| 2,168,049 | Skellett | Aug. 1, 1939 |
| 2,375,004 | Knowles | May 1, 1945 |
| 2,378,383 | Arndt | June 19, 1945 |
| 2,459,679 | Beyer et al. | Jan. 18, 1949 |
| 2,517,591 | Nightenhelser | Aug. 8, 1950 |
| 2,578,939 | Moran | Dec. 18, 1951 |
| 2,605,556 | Jones | Aug. 5, 1952 |
| 2,674,812 | Hales | Apr. 13, 1954 |
| 2,678,382 | Horn et al. | May 11, 1954 |
| 2,679,035 | Daniels et al. | May 18, 1954 |
| 2,727,229 | Anast et al. | Dec. 13, 1955 |
| 2,775,828 | Harwood | Jan. 1, 1957 |
| 2,779,106 | Harwood | Jan. 29, 1957 |